United States Patent [19]

Szulman

[11] 3,835,594
[45] Sept. 17, 1974

[54] TOOLMAKER'S VISE
[76] Inventor: Eigard Szulman, 24 Osborne Rd., West Hempstead, N.Y. 11552
[22] Filed: May 23, 1973
[21] Appl. No.: 363,068

[52] U.S. Cl............. 51/220, 269/138, 269/152, 269/251
[51] Int. Cl......... B23q 3/02, B24b 3/34, B25b 1/24
[58] Field of Search...... 33/174 S, 174 TC, 174 TD; 51/217 A, 218 A, 220, 221 R, 221 BS; 269/71, 244, 258

[56] References Cited
UNITED STATES PATENTS

| | | | |
|---|---|---|---|
| 1,372,661 | 3/1921 | Secord | 269/258 X |
| 1,954,708 | 4/1934 | Mass | 269/104 |
| 2,396,904 | 3/1946 | Walters | 51/220 |
| 2,538,640 | 1/1951 | Click | 33/174 TD |
| 2,841,930 | 7/1958 | Horst | 51/220 X |

Primary Examiner—Roy Lake
Assistant Examiner—Neil Abrams
Attorney, Agent, or Firm—Bauer & Amer

[57] ABSTRACT

A toolmaker's vise for clamping die sections between surfaces having predetermined angular positions to produce the desired cutting or rake angle on the die section when the same are subsequently worked upon by a cutting tool.

12 Claims, 5 Drawing Figures

PATENTED SEP 17 1974  3,835,594
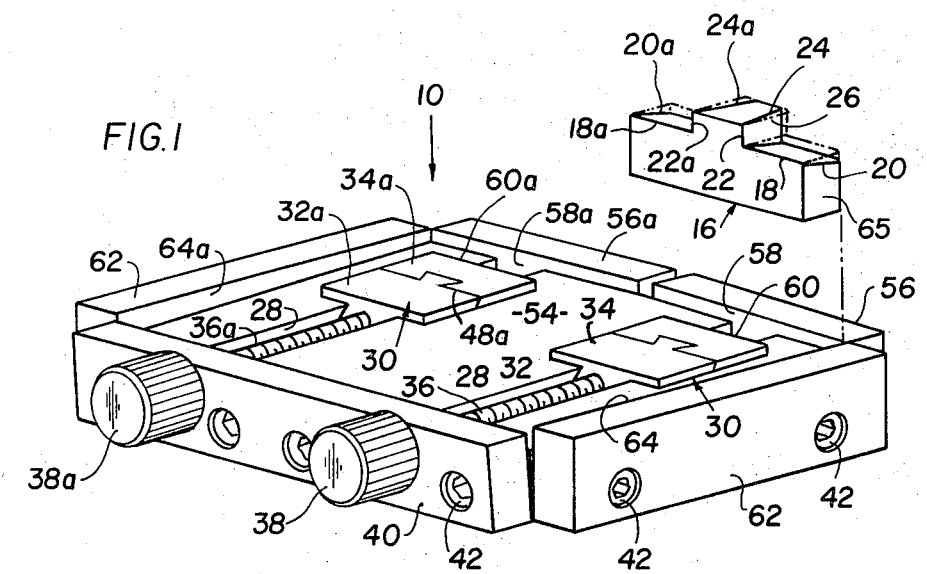
FIG. 1
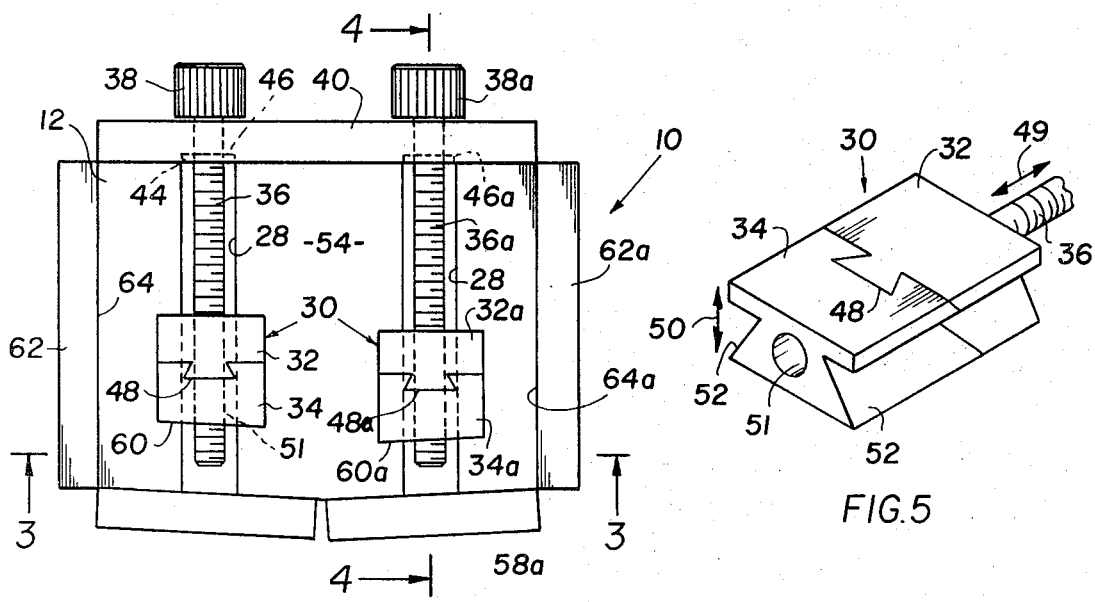
FIG. 2
FIG. 5
FIG. 3
FIG. 4

TOOLMAKER'S VISE

BACKGROUND OF THE INVENTION

Metal working cutting dies usually include die sections having cutting edges. For each of the die sections to operate properly and to perform their die cutting functions efficiently, it is necessary for the toolmaker to provide the cutting edges with a rake or cutting angle. In the past, this has been accomplished by the toolmaker who usually improvises elaborate devices to shim or angularly raise the die section relative to the working or cutting tool so as to present a surface of the die section at an angle to the cutting tool and thereby produce the rake or cutting angle on the die section. The rake or cutting angle is generally performed by a grinding tool which includes a movable table on which die sections are positioned relative to a grinding wheel. Oftentimes, the grinding table is magnetized and, therefore, the procedures required in positioning the die sections with respect to the grinding wheel are elaborate and, needless to say, time consuming.

Moreover, these procedures are not too often satisfactory because the shim and other supporting structural details used by the diemaker or toolmaker in positioning the die sections relative to the grinding wheel may have a tendency to shift even under the influence of the magnetic field that may be applied to the grinding tool table. Hence, the die sections may shift with respect to the grinding wheel, and as a result the elaborate procedures in positioning the die section are wasted.

Other attempts have been made to clamp the workpiece in a vise which is then supported on shims and other ancillary supporting structures to angularly position the workpiece held by the vise at a proper angle to the cutting tool. Thses attempts have suffered from the same problem as the use of shims and supporting structures per se. Furthermore, the elaborate equipment involved in shimming the vise on the magnetized tool table has rendered the procedures time consuming and expensive, while at the same time often failing to overcome the prior art problems.

Vises for clamping and holding die sections and other workpieces are exemplified in the prior art by U.S. Pat. Nos. to Jesionowski 2,347,111 and Lehmann 1,499,989.

SUMMARY OF THE INVENTION

The desideratum of the present invention is to provide a vise that will directly clamp a workpiece in the positions required to present the desired surfaces of the workpiece to the cutting tool so as to produce on the workpiece the proper rake or cutting angle without the need for shims or other ancillary supporting structures.

Another object of the invention is to provide a toolmaker's vise having defined thereon clamping and positioning surfaces, that when the workpiece is engaged therebetween, the same is automatically positioned to be worked upon by the cutting tool.

Still another object is to provide a toolmaker's vise that is simple in structure, easy to operate and efficient to use in such manner that it obviates the need for any other supporting structural details.

A further object and feature of the invention resides in its novel arrangement of structural details which enables its ready application for use with a workpiece and its disassociation therefrom.

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein:

FIG. 1 is a perspective view of the toolmaker's vise constructed according to the teaching of the invention;

FIG. 2 is a top view;

FIG. 3 is a cross-section of FIG. 2 taken along lines 3—3;

FIG. 4 is a cross-section of FIG. 2 taken along lines 4—4; and

FIG. 5 is a perspective view of one of the vise clamps.

DESCRIPTION OF THE INVENTION

Referring now to the drawing, the toolmaker's vise thereshown is generally identified by the numeral 10 and comprises a base 12, the bottom or undersurface 14 of which is substantially flat and planar and is adapted to be positioned in a horizontal plane. The base 12 provides the support for the remaining details of structure adapted to produce cutting or rake angles on a workpiece generally identified by the numeral 16. The workpiece 16 is illustrated in FIG. 1 and may be of any desired or necessary shape to perform its function within a cutting die.

The workpiece 16 illustrated in FIG. 1 is exemplary of die sections and is here utilized solely to provide a clearer understanding of the details of the invention and how the same may be adapted to enable the production of rake or cutting angles on such workpiece. In this regard, reference is made in FIG. 1 and in particular to the workpiece 16 thereshown wherein it is noted that a horizontally disposed cutting edge 18 may be provided thereon by removing a portion of the metal from the workpiece 16 along a rake line 20 so as to remove the material adjacent to the line 20 and produce a rake or cutting angle behind the edge 18. In the production of the vertically disposed cutting edge 22, it is desirable to produce a rake line 24 by removing the material 26 behind the cutting edge.

If similar cutting edges 18a and 22a are adapted to be provided on the workpiece 16, similar rake lines 20a and 24a will be provided on the workpiece. The present invention is adapted to enable the production of such predetermined cutting edges and rake lines by quickly and easily positioning the workpiece 16 on the vise 10 for proper production of the cutting edges and rake angles by a cutting tool, such as a grinding tool.

Referring now to the vise 10, the base 12 is provided with elongated partial dovetail shaped slots or guide groove tracks 28 extending for the lengths thereof. Two such slots are provided in the base for two separate side-by-side clamping means generally identified by the numeral 30. The clamping means 30 are adapted to slidably move and to be guided within the tracks 28 toward and away from clamping position against the workpiece 16. To enable this to be accomplished, the clamping means 30 include conjointly movable jaw members 32 and 34, each of which is mounted upon an operable screw 36.

The screw 36 is threadably engaged with the interior of the jaw 32 and thus causes the same to move in consequence of the rotation of a ribbed or knurled knob 38. The screw 36 passes through a rear plate 40 that is secured by any form of convenient securing means 42 to the base 12. Positioned within undercut openings 44 in the plate 40 are shoulders 46 provided on the screws 36 so as to assure that the rotation of the knob 38 will not cause the screw to move but rather will cause the jaws of the clamping means 30 to move along the track afforded by the slot or groove 28. Hence, the clamping means 30 move in a predefined path in response to the operation of knob 38.

Referring to the clamping means 30 and more particularly to FIG. 5, the jaws 32 and 34 thereof are formed with a dovetail cooperating connection 48 angles to the vertical which enables the two jaw members 32 and 34 to move conjointly in their path in response to the rotation of the screw 36 as shown by the double-headed arrow 49 in FIG. 5. However, the dovetail connection further enables the two jaw members to move vertically relative to each other in the manner shown by the double-headed arrow 50 in FIG. 5. This is accomplished by providing the forward clamping jaw 34 with a through hole 51 that is larger than the screw 36 to enable the same to pass completely therethrough with a sufficient amount of clearance that the jaw may move vertically with respect to the screw. The dovetail walls 52 of the jaw 34 are slightly smaller in size than the correspondingly-shaped walls of the slot or groove 28, thus permitting the clamping jaw 34 to move up and down with respect to the base 12 while the rear clamping jaw 32 is guided precisely in its path of movement with respect to the base 12 by its close engagement with the walls of the track 28.

The base 12 has an upper workpiece supporting surface 54 that is at a slight predetermined angle to the horizontally disposed bottom surface 14. The angular separation between the surfaces 54 and 14 is equal to the rake angle defined by the line 20 on the workpiece 16 after the material is removed behind the cutting edge 18. Thus, if the rake angle for the line 20 of the workpiece is three-quarter degree, all rake angles are correspondingly three-quarter degree. As a consequence, the clamping means 30 is also moved along a path that is at a predetermined angle with respect to the horizontal surface 14. The angle of movement with respect to the surface 14 of the clamping means 30 corresponds to that of the workpiece supporting surface 54.

Included within the clamping means 30 is a clamping member 56 that is secured much in the same manner as the securing means 42 to the base 12. The clamping means 56 presents a clamping surface 58 that is substantially planar in shape for cooperation with a corresponding cooperating clamping surface 60 on the movable clamping jaw 54. Because of the angled relationship of the screw 36 with respect to the bottom 14, the surface 58 is similarly angled with respect to the bottom 14 so that its predetermined angle out of the vertical plane will be substantially perpendicular to the angle of the path of movement of the clamping means 30 with respect to the bottom 14. Thus, the surfaces 58 and 60 remain in substantial parallelism. Hence, when the workpiece 16 is positioned on the workpiece supporting surface 54 between the clamping surfaces 58 and 60, the workpiece is automatically tilted with respect to the working tool that will be required to produce the rake line 20 thereon and to remove the material from the workpiece along such rake line.

To aid in the proper positioning of the workpiece between the clamping surfaces 58 and 60, there is provided a side guide means 62. The side guide 62 borders the side of the base 12 and is secured thereto by an convenient means, such as the screws 42. The side guide means 62 provides a guiding surface 64 which is parallel to the axis of the screw 36. Hence, when the side 65 of the workpiece 16 is abutted against the guide wall or surface 64, the workpiece 16 is automatically positioned between the clamping surfaces 58 and 60 and, hence, because the workpiece is seated on the angled supporting surface 54, the proper rake angle will be provided behind the cutting edge 18 along the rake line 20 when the vise 10 is positioned on the bed or worktable (not shown) of a cutting tool such as a grinding tool.

No extraneous shimming or additional positioning of the vise is required such as is disclosed in the prior art disclosure of Jesionowski previously referred to herein. No shims or auxiliary structures are required to further place the workpiece in its desired position beneath the cutting tool for the cutting tool to produce the desired rake angle behind the cutting edge 18. The present toolmaker's vise 10 simply locks or clamps the workpiece 16 to it at the proper angle and thereafter the bottom 14 of the vise 10, when positioned on the worktable of the cutting tool, will automatically position the workpiece such that the cutting tool will produce the desired rake angle behind the cutting edge 18.

The present invention has further commendable attributes in that once the workpiece 16 is clamped between the clamping surfaces 58 and 60, the workpiece is automatically positioned on the vise 10 to enable a cutting tool or grinding wheel to produce the vertically disposed cutting edge 22 by removing the material 26 along the rake line 24 thereon. This is accomplished by positioning the clamping member 56 at an angle to the axis of the operable screw 36 or to the track or path 28 equal to the rake angle to be produced on the workpiece along the line 24 behind the cutting edge 22.

Thus, it will be seen from a view of FIG. 2 that the surface 58 is angularly positioned with respect to the axis of the screw 36 and also correspondingly with respect to the path of movement of the clamping means 30. By so angling the clamping member 56 and its clamping surface 58, the workpiece may be automatically positioned beneath or with respect to a grinding wheel to remove the material 26 along the rake line 24 to produce the cutting edge 22. FIG. 2 clearly illustrates that the cooperating clamping surface 60 on the forward movable jaw 34 is similarly angled with respect to the path of movement of the rear jaw 32 and the axis of the operating screw 36.

From what has been disclosed heretofore, it is apparent that the vise 10 can produce not just one but two cutting edges in different planes on a workpiece 16 by removing material therebehind to produce a proper cutting or rake angle. If it were desired and necessary to provide additional cutting edges on the same workpiece, such as the edges 22a and 18a, it is merely necessary to unclamp the workpiece 16 from between the clamping surfaces 58 and 60 and then simply move the workpiece to the opposite side of the vise for clamping between the adjacent set of clamping surfaces 58a and 60a by accurately positioning the wall of the workpiece 16 opposite that of the wall 65 against the guide surface 64a. For ease of understanding and convenience of explanation, the clamping structure on the right-hand side of FIG. 2 is designated by the subletter "a" to identify like parts to those described on the left-hand side of the vise 10 of FIG. 2.

The second clamping and guide means arranged on the base 12 on the right-hand side of the vise 10 are merely arranged opposite hand of the first mentioned and described clamping and guide means structures. Obviously, the workpiece supporting surface 54 extends completely across the top of the vise for use by and with the respective clamping and guide structures on either side of the vise.

When the workpiece 16 is moved for clamping engagement between the surfaces 58a and 60a, the cutting edges 18a will be produced thereon when the workpiece is positioned beneath a grinding wheel or other cutting tool. The cutting edge 22a will be produced on the workpiece 16 when the grinding wheel or other cutting tool removes the material along the rake line 24a. As long as the vise 10 is positioned on a smooth, flat surface so that its bottom 14 is in horizontal relationship to the axis of the cutting tool, the rake angles can be produced on any workpiece in the vertical and horizontal planes on opposite sides of such workpieces simply by moving the workpiece between the right and the left-hand sides of the vise 10. The present vise is peculiarly adaptable for use on magnetic or magnetized tables since the same may be of a highly magnetizable material and, thus, may be directly held to the table by magnetic lines of force passing therethrough.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:
1. In a toolmaker's vise for use on a table of a tool,
a base having a surface on which a workpiece is adapted to be mounted,
a jaw movable along a path at an angle upwardly inclined relative to the bottom of said base,
means to move said jaw along said path,
a clamp member fixedly mounted on said base and having a surface at an inclined angle predetermined with respect to the path of movement of said jaw and substantially parallel to said movable jaw to clamp a workpiece therebetween at said predetermined angle to enable a corresponding rake angle to be produced on said workpiece,
and said base bottom having a surface to be mounted in a horizontal plane in surface engagement with the table of a tool to produce said rake angle on the workpiece.

2. In a toolmaker's vise as in claim 1,
said clamp member surface also being at a predetermined angle inclined upward relative to the horizontal plane.

3. In a toolmaker's vise as in claim 2,
said base workpiece supporting surface being perpendicular to said clamp surface and at an angle inclined upward relative to said horizontal plane.

4. In a toolmaker's vise as in claim 3,
a guide member on said vise against which the workpiece is adapted to be positioned to locate the same for clamping engagement between said jaw and clamp member.

5. In a vise for use in producing desired rake angles on a workpiece,
a base having a horizontal bottom surface,
a plurality of jaws each having a surface movable in a respective path along and fixed at an angle relative to said base horizontal surface,
means to move each of said jaw surfaces along their respective paths,
and clamp means fixed on said base, one for each of said respective movable jaw surfaces, each said clamp means having a clamping surface that is in a plane positioned at a predetermined inclination with respect to the path of movement of its respective jaw surface and positioned in a plane substantially parallel to its respective jaw surface to clamp a workpiece therebetween at a predetermined angle corresponding to a desired rake angle to be produced on the workpiece.

6. In a vise as in claim 5,
said predetermined angle being relative to a vertical plane passing therethrough,
said base having a workpiece support surface substantially perpendicular to said clamp surface.

7. In a vise as in claim 6,
said base and movable jaw surface each having guide means thereon cooperable to guide the movement of said jaw surface in their paths along the planes substantially perpendicular to the plane of the respective clamp surface.

8. In a vise,
a base having a substantially horizontal planar bottom,
clamping means mounted at one predetermined angle inclined with respect to said horizontal bottom to clamp a workpiece on said base at said one predetermined angle inclined to said horizontal bottom corresponding to a first rake angle to be produced on one surface of the workpiece,
said clamping means including a fixed clamping member and a jaw movable in a path relative thereto,
said fixed clamping member being mounted at a second predetermined angle with respect to the path of movement of said jaw to clamp a workpiece at said second predetermined angle corresponding to a second rake angle to be produced on another surface of a workpiece,
and said jaw and clamping member each having clamping surfaces substantially parallel to the other.

9. In a vise as in claim 8,
guide means cooperating with said base to position a workpiece at said clamping means.

10. In a vise as in claim 8,
said base having a workpiece supporting surface at a predetermined angle to said horizontal bottom corresponding to said one predetermined angle.

11. In a vise as in claim 8, guide means on said base,
said movable jaw including two relatively movable jaw members,
each said jaw member including guide means cooperating with the other at an angle to said horizontal bottom to enable vertical displacement of one of said jaw members relative to the other,
and guide means on said jaw members cooperable with said base guide means to cause said members to move conjointly with each other along said path.

12. In a vise as in claim 11,
and second clamping and guide means arranged on said base on opposite hand of said first mentioned clamping and guide means and cooperable with said base workpiece supporting surface to enable the clamping of a workpiece to produce third and fourth rake angles thereon.

* * * * *

UNITED STATES PATENT OFFICE
CERTIFICATE OF CORRECTION

Patent No. 3,835,594                    Dated   September 17, 1974

Inventor(s) Eigard Szulman

It is certified that error appears in the above-identified patent and that said Letters Patent are hereby corrected as shown below:

IN THE CLAIMS:

Claim 7, Line 2, change "surface" to --surfaces--
Claim 7, Line 4, change "surface" to --surfaces--

Signed and sealed this 12th day of November 1974.

(SEAL)
Attest:

McCOY M. GIBSON JR.                 C. MARSHALL DANN
Attesting Officer                   Commissioner of Patents